US011893144B2

(12) United States Patent
Singh et al.

(10) Patent No.: US 11,893,144 B2
(45) Date of Patent: *Feb. 6, 2024

(54) SYSTEM AND METHOD FOR SLICE VIRTUAL DISK ENCRYPTION

(71) Applicant: DELL PRODUCTS L.P., Round Rock, TX (US)

(72) Inventors: Ankit Singh, Bangalore (IN); Vinod Parackal Saby, Bangalore (IN); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,915

(22) Filed: Aug. 3, 2022

(65) Prior Publication Data
US 2022/0374554 A1 Nov. 24, 2022

Related U.S. Application Data

(63) Continuation of application No. 16/527,716, filed on Jul. 31, 2019, now Pat. No. 11,468,201.

(51) Int. Cl.
*G06F 21/79* (2013.01)
*G06F 9/455* (2018.01)
(Continued)

(52) U.S. Cl.
CPC ............ *G06F 21/79* (2013.01); *G06F 3/0623* (2013.01); *G06F 3/0644* (2013.01);
(Continued)

(58) Field of Classification Search
CPC ...... G06F 21/79; G06F 3/0623; G06F 3/0644; G06F 3/0659; G06F 3/0664;
(Continued)

(56) References Cited

U.S. PATENT DOCUMENTS 9,477,182 B2 10/2016 Ikebuchi et al.
10,114,706 B1 * 10/2018 Chougala .............. G06F 9/5027
(Continued)

OTHER PUBLICATIONS

"Security Resources and Information," VMWare vSphere 5.5, pp. 1-2, Oct. 7, 2014.
(Continued)

*Primary Examiner* — Jung W Kim
*Assistant Examiner* — Howard H. Louie
(74) *Attorney, Agent, or Firm* — Larson Newman, LLP

(57) ABSTRACT

A system includes a virtual machine to transmit an input/output request to a data storage system and a hypervisor configured to maintain a map of the virtual machine to a virtual disk, wherein the virtual disk is a slice of a persistent storage device. A virtual machine server is configured to maintain a map of the virtual disk to a start address and an end address and to update the input/output request with the start address, the end address, and a virtual disk identifier associated with the virtual machine. A processor determines whether the start address and the end address are valid, and if the start address and the end address are valid, then process the input/output request. The response is transmitted to the input/output request.

20 Claims, 5 Drawing Sheets

(51) Int. Cl.
*H04L 9/08* (2006.01)
*G06F 21/06* (2006.01)
*G06F 3/06* (2006.01)
*G06F 21/60* (2013.01)

(52) U.S. Cl.
CPC .......... *G06F 3/0659* (2013.01); *G06F 3/0664* (2013.01); *G06F 3/0673* (2013.01); *G06F 9/45558* (2013.01); *G06F 21/602* (2013.01); *H04L 9/083* (2013.01); *H04L 9/0822* (2013.01); *H04L 9/0861* (2013.01); *G06F 2009/45583* (2013.01); *G06F 2009/45587* (2013.01)

(58) Field of Classification Search
CPC .. G06F 3/0673; G06F 9/45558; G06F 21/602; G06F 2009/45583; G06F 2009/45587; G06F 9/455; G06F 21/60; H04L 9/0822; H04L 9/083; H04L 9/0861; H04L 9/08
See application file for complete search history.

(56) References Cited

U.S. PATENT DOCUMENTS

| 10,496,444 | B2* | 12/2019 | Tajima .................. G06F 9/5016 |
| 2016/0171249 | A1* | 6/2016 | Circello .................. G06F 21/72 |
| | | | 713/189 |
| 2016/0342348 | A1 | 11/2016 | Vidyadhara et al. |
| 2016/0371105 | A1* | 12/2016 | Sieffert .................. G06F 8/656 |

OTHER PUBLICATIONS

"vSphere Networking Security Best Practices," VMware vSphere 6.7, p. 1, Jul. 6, 2015.
"Use Virtual Switches with the vSphere Network Appliance API Only If Required," VMware vSphere 6.7, p. 1, Aug. 10, 2018.
"vSphere Security Update 2," VMware vSphere 6.5, VMware ESXi 6.5, vCenter Server 6.5, pp. 1-258 Apr. 16, 2019.

* cited by examiner

SYSTEM AND METHOD FOR SLICE VIRTUAL DISK ENCRYPTION

CROSS-REFERENCE TO RELATED APPLICATION

This application is a Continuation of U.S. patent application Ser. No. 16/527,716 entitled "System and Method for Slice Virtual Disk Encryption," filed Jul. 31, 2019, the disclosure of which is hereby expressly incorporated by reference in its entirety.

FIELD OF THE DISCLOSURE

The present disclosure generally relates to information handling systems, and more particularly for implementing slice virtual disk encryption.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs, and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system includes a virtual machine to transmit an input/output request to a data storage system and a hypervisor configured to maintain a map of the virtual machine to a virtual disk, wherein the virtual disk is a slice of a persistent storage device. A virtual machine server may maintain a map of the virtual disk to a start address and an end address, and update the input/output request with the start address, the end address, and a virtual disk identifier associated with the virtual machine. A processor determines whether the start address and the end address are valid, and if the start address and the end address are valid, then process the input/output request. The response is transmitted to the input/output request.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
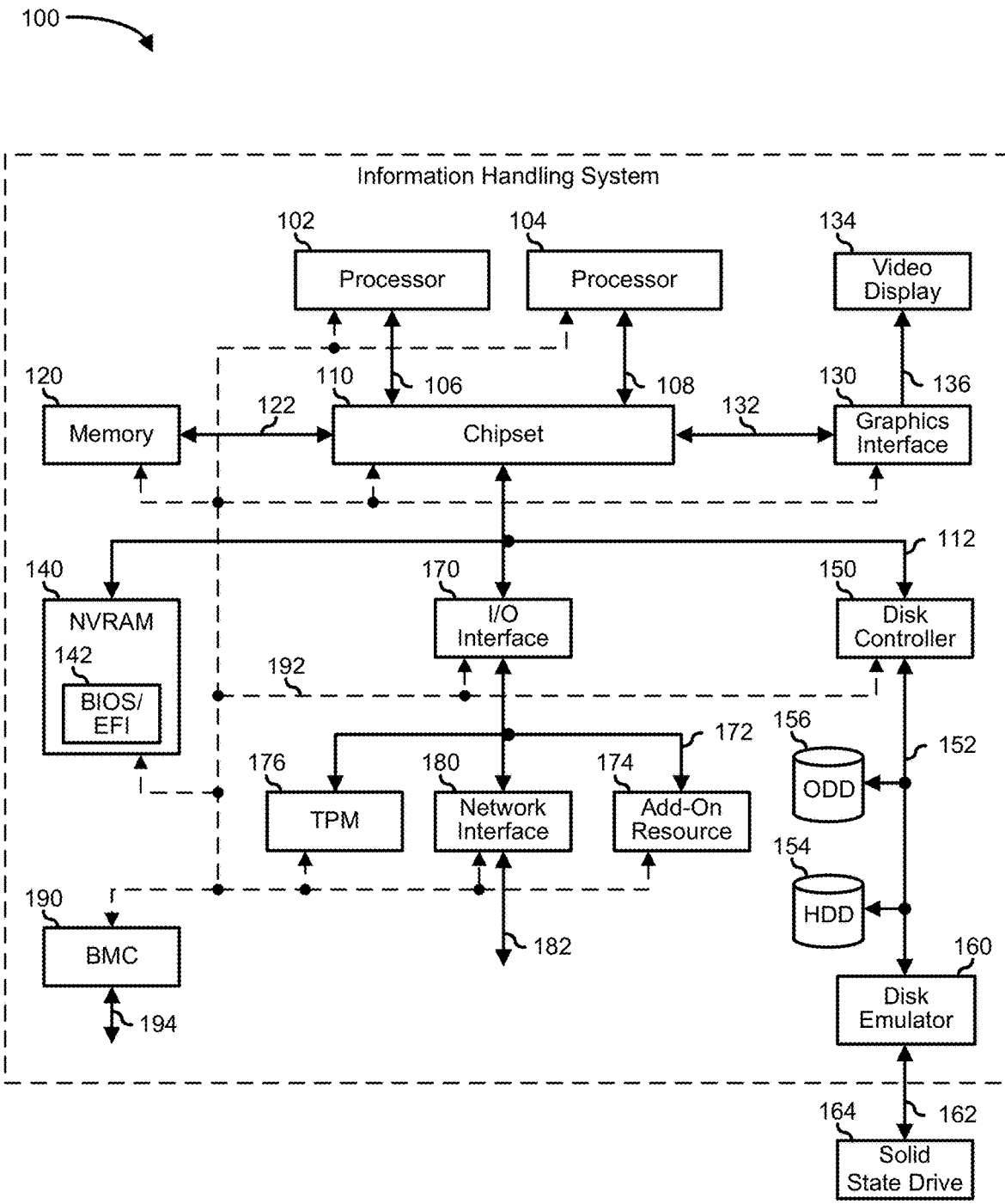
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive (ODD) 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to a hard disk drive (HDD) 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/OS (OS) execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Many computer systems include encrypted data storage systems, such as for example encrypted disk systems that operate to protect information on a disk drive by converting it to unreadable code that cannot be deciphered easily by unauthorized persons. Generally, encrypted disk systems encrypt full disks. Because of this, in instances when a physical disk is associated with more than one virtual disk, and one of the virtual disks needs to be unlocked, the whole physical disk would have to be unlocked. Thus, unlocking one virtual disk may result in unlocking the other virtual disks associated with the physical disk.

Disclosed herein is an improvement that enables a persistent storage device to be associated with one or more virtual disks wherein each virtual disk is encrypted independently of the other virtual disks. This allows for the ability of independently unlocking one virtual disk without unlocking the other virtual disks even if the one virtual disk and the other virtual disks are associated with the same persistent storage device.

Figure 2:
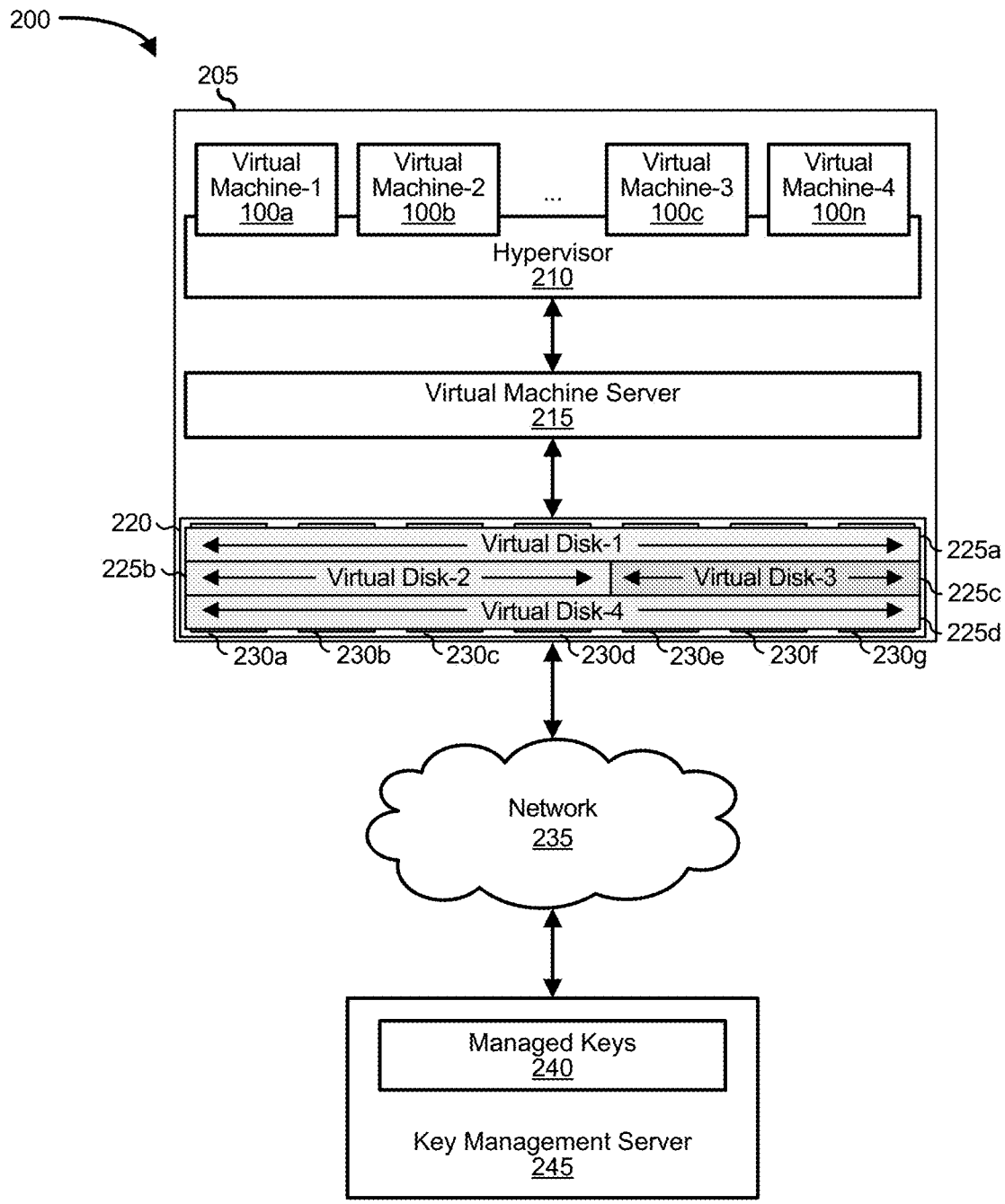
FIG. 2 is a block diagram of an exemplary a computer system with a virtualized computing environment, according to at least one embodiment of the present disclosure.

FIG. 2 is a block diagram of a computer system 200. Computer system 200 includes a virtualized computing environment 205 that is connected to a key management server 245 via a network 235. Virtualized computing environment 205 includes one or more virtual information handling systems also referred to as virtual machines 100a-100n, a hypervisor 210, a virtual machine server 215 and a data storage system 220. Data storage system 220 includes virtual disks 225a-225d and physical drives or persistent storage devices also referred to as disks 230a-230g.

Virtual machine server 215 may be any kind of information handling system or computing device, such as for example, a personal computer, a workstation computer, a server computer, an enterprise server computer, a laptop computer, a tablet computer, a smartphone, etc. Typically, however, virtual machine server 215 may be a server computer or an enterprise server computer, such as an ESX or ESX® server distributed by VMware. Virtual machine server 215 runs virtualization software, such as VMware ESXi, Microsoft Hyper-V, or RedHat® Kernel-based Virtual Machine (KVM). The virtualization software may include hypervisor 210 to manage interactions between the underlying hardware and one or more virtual machines 100a-100n.

Hypervisor 210 may comprise software and/or firmware generally operable to allow multiple OSs to run on a single information handling system at the same time. This operability is generally allowed via virtualization, a technique for hiding the physical characteristics of information handling system resources from the way in which other systems, applications, or end users interact with those resources. Hypervisor 210 may be one of a variety of proprietary and/or commercially available virtualization platforms, including without limitation, IBM® z/VM®, Xen Project®, Oracle® VM, VMWare® ESX® Server, Microsoft Hyper-V®, Sun® Logical Domains, Hitachi® Virtage, etc.

Each one of virtual machines 100a-100n may include a guest operating system (OS), along with an application or other software running on the guest OS. Each guest OS may be any OS compatible with and/or supported by hypervisor 210. In addition, each guest OS may be a separate instance of the same OS or an instance of different OSs. For example, in one embodiment, each virtual machine 100a-100n may have a Linux® OS. As another example, virtual machine 100a may have the Linux OS, virtual machine 100b may have a Microsoft® Windows® OS, and virtual machine 100c may have a VWorks® OS.

Data storage system 220 includes virtual disks 225a-225d, each of which abstracts a set of a storage slices. A virtual disk is a file or set of files that appears as a physical disk drive to an OS. Each storage slice is provided from one or more persistent storage devices, such as disks 230a-230g, which may be a redundant array of independent disk (RAID) group. The persistent storage devices may include computer-readable media which may generally be operable to store data such as hard disk drive, floppy disk drive, CD-ROM and/or another type of rotating storage media, flash memory EEPROM, and/or another type of solid-state storage media. The persistent storage devices may include a self-encrypting drive (SED), which is a persistent storage device with circuity built into the disk drive controller chip that encrypts data before it is written to the storage device and decrypts the data as it is read. The encryption and decryption performed by the SED may be based on Trusted Computing Group (TCG) specifications. The encryption and decryption may be performed using a media encryption key (MEK).

I/O operations on the persistent storage devices may be accessed at the granularity of the size of a logical block which is addressed by logical block address (LBA). Data storage system 220 may be configured as one LBA space which may be divided into LBA ranges, also referred to as data bands or simply bands. An LBA specifies the location of blocks of data stored on the persistent storage devices. An LBA range includes a range of logical blocks from one location to another. As used herein, a virtual disk also referred to as a slice virtual disk may be an abstract representation of one LBA range. The virtual disk may include one or more segments also referred to as portions slices of one or more persistent storage devices. The LBA range may be defined by a start address and an end address. The start address identifies the location of the first logical block in the LBA range. The end address identifies the location of the last logical block in the LBA range. Instead of specifying the exact address per read or write, the virtual machine may provide the LBA range, via the start address and the end address, to the data storage system. The LBA range may also be identified by the start address and a length, wherein the length specifies the number of blocks included in the LBA range.

In another embodiment, each persistent storage device such as disks 230a-230g may be configured as one LBA space which may be divided into LBA ranges. In this example, one LBA range is equivalent one slice of the persistent storage device. Thus, a virtual disk may include one or more LBA ranges or bands.

Network 235 may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 235 may transmit data using any storage and/or communication protocol, including without limitation, a Fibre Channel, a Frame Relay, an Asynchronous Transfer Mode (ATM), an Internet Protocol (IP), other packet-based protocol, an SCSI, an Internet SCSI (iSCSI), a Serial Attached SCSI (SAS), or any other transport that operates with the SCSI protocol, advanced technology attachment (ATA), a serial ATA (SATA), an advanced technology attachment packet interface (ATAPI), a serial storage architecture (SSA), an integrated drive electronics (IDE), and/or any combination thereof. Network 235 and its various components may be implemented using hardware, software, or any combination thereof.

Key management server 245 may be a local or an external key management service (KMS) that stores, manages, and serves authentication and/or encryption keys. Key management server 245 may be configured to generate and store a set of encryption keys such as managed keys 240, such as an encryption key store. The encryption keys may be used to perform symmetric key encryption, in which the same key may be used for both encryption and decryption. In other embodiments, the encryption keys may be used to perform asymmetric-key encryption, in which different keys are used for encryption and decryption, and in which both an encryption key and different decryption key may be stored for a data object in a corresponding record of encryption key store.

In response to a received encryption key request, key management server 245 may provide one or more stored encryption keys, such as an MEK and/or a key encryption key (KEK). The encryption key request may include information identifying the virtual disk and/or virtual machine, the LBA range, the start address, the end address, etc. Based on one or more of the aforementioned information, key management server 245 may select one or more of the encryption keys and communicate the selected keys.

Key management server 245 may generate the KEK during provisioning. The provisioning may include allocating the virtual disks, that is assigning the start address and the end address for each virtual disk. The provisioning may also include associating each virtual disk to one or more virtual machines. In addition, the provisioning may also include assigning a KEK for each persistent storage device. The KEK may include a private key and a public key. The private key may be stored in KMS while public key is given to the server. In another embodiment KMS, holds both the private and public key and the virtual machine server stores the identifier of the public key.

Figure 3:
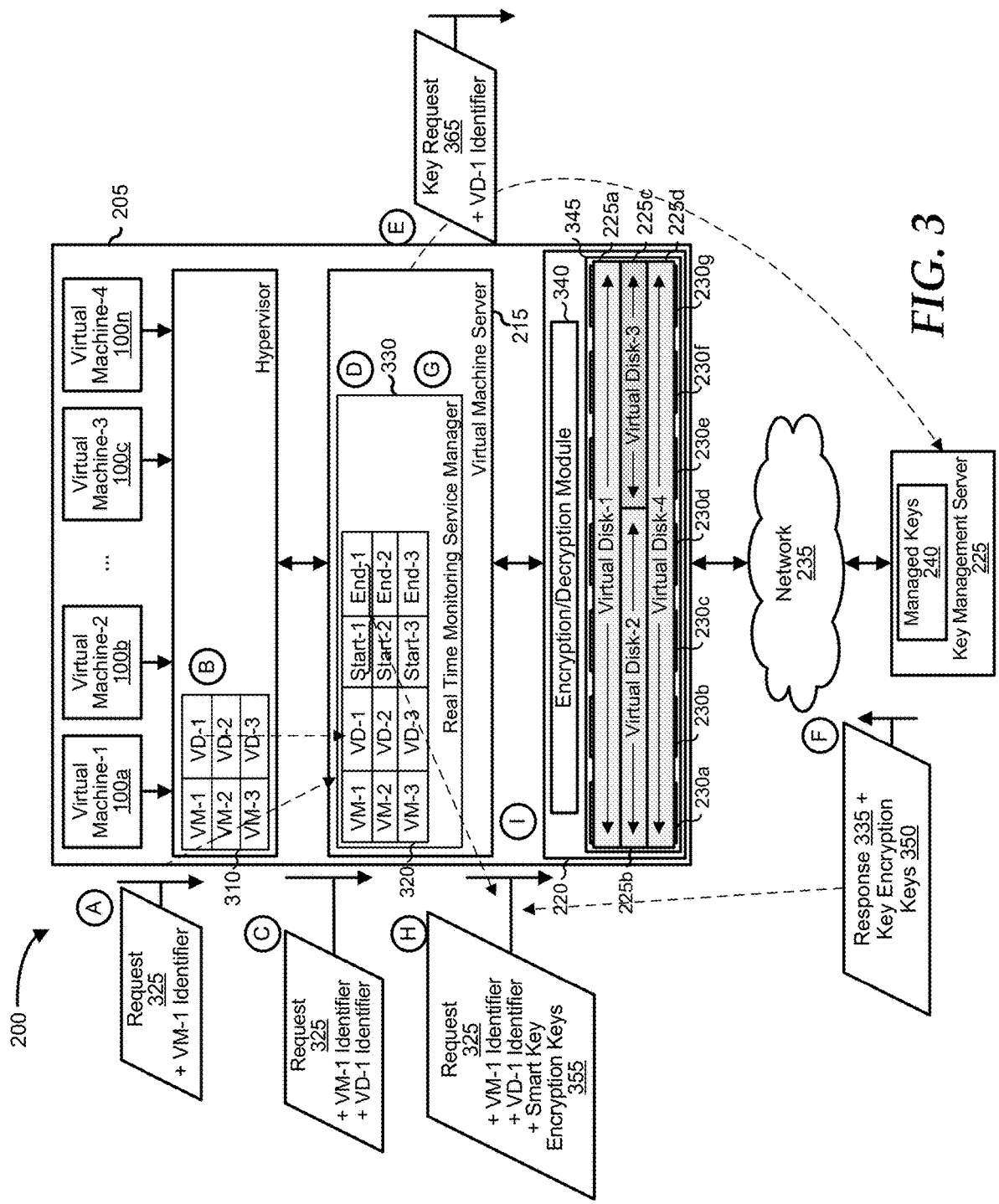
FIG. 3 is a block diagram of the computer system in greater detail, according to at least one embodiment of the present disclosure

FIG. 3 is a block diagram of virtualized computing environment 205 in greater detail. Virtualized computing environment 205 includes virtual machines 100a-100n, hypervisor 210, virtual machine server 215, data storage system 220, network 235, and key management server 245. Hypervisor 210 includes a mapping table 310. Virtual machine server 215 includes a real-time monitoring service manager (RTSM) 330 which includes an address lookup table 320. Data storage system 220 includes an encryption/decryption module 340 and a data storage 345. Data storage 345 includes disks 230a-230g and virtual disks 225a to 225d.

Hypervisor 210 may be configured to maintain a map, such as mapping table 310, that shows the association of the virtual machines to the virtual disks. Hypervisor 210 may use a data structure such as a table, a database, a hash, and the like. A virtual machine may be associated with one or more virtual disks. A virtual disk may be associated with one or more virtual machines.

Virtual machine server 215 includes RTSM 330. RTSM 330 represents one or more processing devices, such as a dedicated BMC System-on-a-Chip (SoC) device, one or more associated memory devices, one or more network devices, a complex programmable logic device (CPLD), and the like, that operate together to provide the management environment for virtual machine server 215 and its resources such as virtual machines 100a-100n and hypervisor 210. In particular, RTSM 330 may be connected to various components of virtual machine server 215 via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation, management, and/or control of the virtual machines being hosted by virtual machine server 215. An example of RTSM 330 may include a commercially available BMC product that operates in accordance with the IPMI specification, such as an iDRAC, or the like. RTSM 330 may further include associated memory devices, logic devices, security device, or the like, as needed or desired.

RTSM 330 may be configured to maintain data structures and/or protocols such as PCIe vendor defined message (VDM) or management component transport protocol (MCTP) for managing I/O operations between virtual machines 100a-100n and virtual disks 100a-100g. RTSM 330 may use one or more MCTP commands to determine information associated with a virtual disk in an I/O read or write such as virtual disk identifier, a start address, an end address, a virtual machine the virtual disk is associated with, etc. For example, RTSM 330 maintains address lookup table 320 which identifies the virtual machine, the virtual disk associated with the virtual machine, and the start address and the end address of the virtual disk. Address lookup table 320 may include identifiers for the virtual machine, the virtual disk, the start address, and the end address. In another embodiment, the start address and the end address may be in an LBA format, a cylinder-head-sector (CHS) format, or the like. In another embodiment, address lookup table 320 may not include information regarding the virtual machine mapped to the virtual disk. For example, address lookup table 320 may include the virtual disk, the start address, and the end address.

Encryption/decryption module 340 may comprise any system, device, or apparatus configured to encrypt data for storage on one or more of virtual disks 225a-225d and/or encrypt data read from one or more of virtual disks 225a-225d. Encryption/decryption module 340 may be configured to execute multiple cryptographic functions such as encryption algorithms, algorithm modes, cryptographic hashes, and/or cryptographic sign functions. Encryption/decryption module 340 may operate based on a National Institute of Standards and Technology (NIST) Federal Information Processing Standard (FIPS) 197 Advanced Encryption Standard (AES) such as AES-128 or AES-256. The AES algorithm is a symmetric key algorithm which uses the same key for encrypting/decrypting the data on the disk drive. The numbers refer to the bit-size of the encryption key used by the algorithm which may be a 128-bit (16 bytes) or 256-bit (32 bytes) random number.

Encryption/decryption module 340 may also be configured to load encryption keys for encryption and decryption tasks from a KMS or otherwise. In these and other embodiments, a particular cryptographic function and/or an encryption key may be specified as a function of a task performed by encryption/decryption module 340. Accordingly, encryption/decryption module 340 may include a plurality of cryptographic functions that may be executed. These cryptographic function may load one or more encryption keys in order to perform the task, such as an I/O operation. The task and/or owner's ability to load the encryption key may be authenticated by encryption/decryption module 340 prior to acceptance of the encryption key.

In one embodiment, the encryption/decryption module 340 may generate and/or store internal encryption keys to encrypt/decrypt data stored in virtual disks 225a-225d. These encryption keys may be used as a disk encryption key (DEK) also known as the MEK and may be AES-128 or AES-256 randomly generated keys. The MEK may be used to encrypt the I/O data prior to storage and to decrypt the I/O data after retrieval. The encryption keys may be stored in the encryption/decryption module 340's non-volatile memory (NVMe) or similar device. The encryption keys may also be generated, stored and/or managed by a KMS such as key management server 245. As shown herein, encryption/decryption module 340 ensures that it is encrypting and decrypting the data within the start address and the end address associated with the virtual disk, as determined based on a smart KEK (SKEK) thus achieving parallel encryption with the slice virtual disks in contrast with existing perpendicular encryption.

Disks 230a-230g may be non-encrypting disks or SEDs. SEDs are typically configured according to the Opal Security Subsystem Class Specification, an open specification promulgated by the TCG. Virtual machines 100a-100n may be configured to execute an application, a device driver, and/or a middleware to facilitate I/O operations such as read and write operations involving data storage systems, such as data storage system 220. The application may include an OS or specialized application program configured to manage and/or control the I/O operation such as data reads from or writes to virtual disks 225a-225d.

FIG. 3 is annotated with a series of letters A-I. These letters represent stages of operations. Although these stages are ordered for this example, the stages illustrate one example to aid in understanding this disclosure and should not be used to limit the claims. Subject matter falling within the scope of the claims can vary with respect to the order of the operations.

At stage A, an application in virtual machine 100a performs an I/O operation such as a request 325. Request 325 may be a write operation to or a read operation from data storage system 220. Request 325 may include an identifier of the virtual machine that initiated the request. At stage B, hypervisor 210 processes request 325 prior to its transmission to data storage system 220. During the processing, hypervisor 210 identifies the virtual disk mapped to virtual machine 100a using mapping table 310 based on the virtual machine identifier included in request 325. Mapping table 310 associates each virtual machine to its corresponding or assigned virtual disk. Mapping table 310 may use identifiers, for example, virtual machine identifiers and virtual disks identifiers for the association. In this example, virtual machine 100a is mapped to virtual disk 225a. At stage C, hypervisor 210 updates request 325 with the identifier of the identified virtual disk, virtual disk 225a.

At stage D, virtual machine server 215 determines the start address and the end address of virtual disk 225a that is associated with virtual machine 100a. For example, RTSM 330 may retrieve the identifiers of start address Start-1 and end address End-1 from address lookup table 320. The start address and the end address of virtual disk 225a may include the start address and the end address of each of the persistent storage device included in virtual disk 225a. In this example, the start address and the end address of virtual disk 225a may include "Start1+End1."

At stage E, virtual machine server 215 sends a key request, such as a key request 365, for KEKs to key management server 245. Key management server 245 may generate and store encryption keys such as managed keys 240 which includes KEKs 350. Managed keys 240 may also include MEKs for use by data storage system 220. Virtual machine server 215 may provide key management server 245 the identifier of virtual disk 225a with key request 255. In another embodiment, virtual machine server 215, in addition to the identifier of virtual disk 225a, may also provide the identifier of virtual machine 100a and/or the start address and the end address with key request 365. Key management server 245 may use the virtual disk identifier and/or virtual machine identifier to authenticate key request 365. In another embodiment, key management server 245 may use authentication keys to authenticate the request.

At stage F, key management server 245 responds to the request and transmits the KEKs. In this example, key management server 245 responds to key request 365 with response 335 that includes KEKs 350. Prior to responding, key management server 245 may use the identifier of virtual disk 225a and/or the start address and the end address to determine the KEKs associated with virtual disk 225a. In this embodiment, each persistent storage device may be associated with one KEK. Because virtual disk 225a includes seven persistent storage devices (disks 230a-230g), key management server 245 transmits seven KEKs with response 335, one KEK for each disk of disks 230a-230g. For example, KEKs 350 include: Disk-1(KEK)+(Disk-2 (KEK)+(Disk-3(KEK)+(Disk-4(KEK)+(Disk-5(KEK)+ (Disk-6(KEK)+(Disk-7(KEK).

At stage G, virtual machine server 215 receives KEKs 350 and combines them with the start address, and the end address to generate SKEKs 355. SKEKs 355 includes an SKEK for each persistent storage device in the virtual disk. For example, for virtual disk 225a, the SKEK for disk 1 is "(Disk-1(KEK)+Start1+End1)." The SKEK for disk 2 is "(Disk-2(KEK)+Start1+End1)." The SKEK for disk 3 is "(Disk-3(KEK)+Start1+End1)." The SKEK for disk 3 is "(Disk-3(KEK)+Start1+End1)." The SKEK for disk 4 is "(Disk-4(KEK)+Start1+End1)." The SKEK for disk 5 is "(Disk-5(KEK)+Start1+End1)." The SKEK for disk 6 is "(Disk-6(KEK)+Start1+End1)." The SKEK for disk 7 is "(Disk-7(KEK)+Start1+End1)." At stage H, virtual machine server 215 updates request 325 with SKEKs 355 and transmits request 325 to data storage system 220.

At stage I, data storage system 220 receives request 325 and starts processing the request. In particular, encryption/decryption module 340 may parse request 325 to identify the start address and the end address of virtual disk 225a. Encryption/decryption module 340 then determines whether the start address and the end address are valid. The start address and the end address are valid if they are within the range of LBAs associated with virtual disk 225a. If the start address and the end address are valid, then data storage system 220 may process request 325. For example, if request 325 is a write operation then encryption/decryption module 340 may encrypt the I/O data prior to storage. If request 325 is a read operation, then encryption/decryption module 3400 may decrypt the I/O data after retrieving the I/O data from data storage 345 prior to transmitting to virtual machine 100a. If the start address and the end address with request 325 are not valid, then data storage system 220 may deny or not process request 325 and may send an I/O failure.

Figure 4:
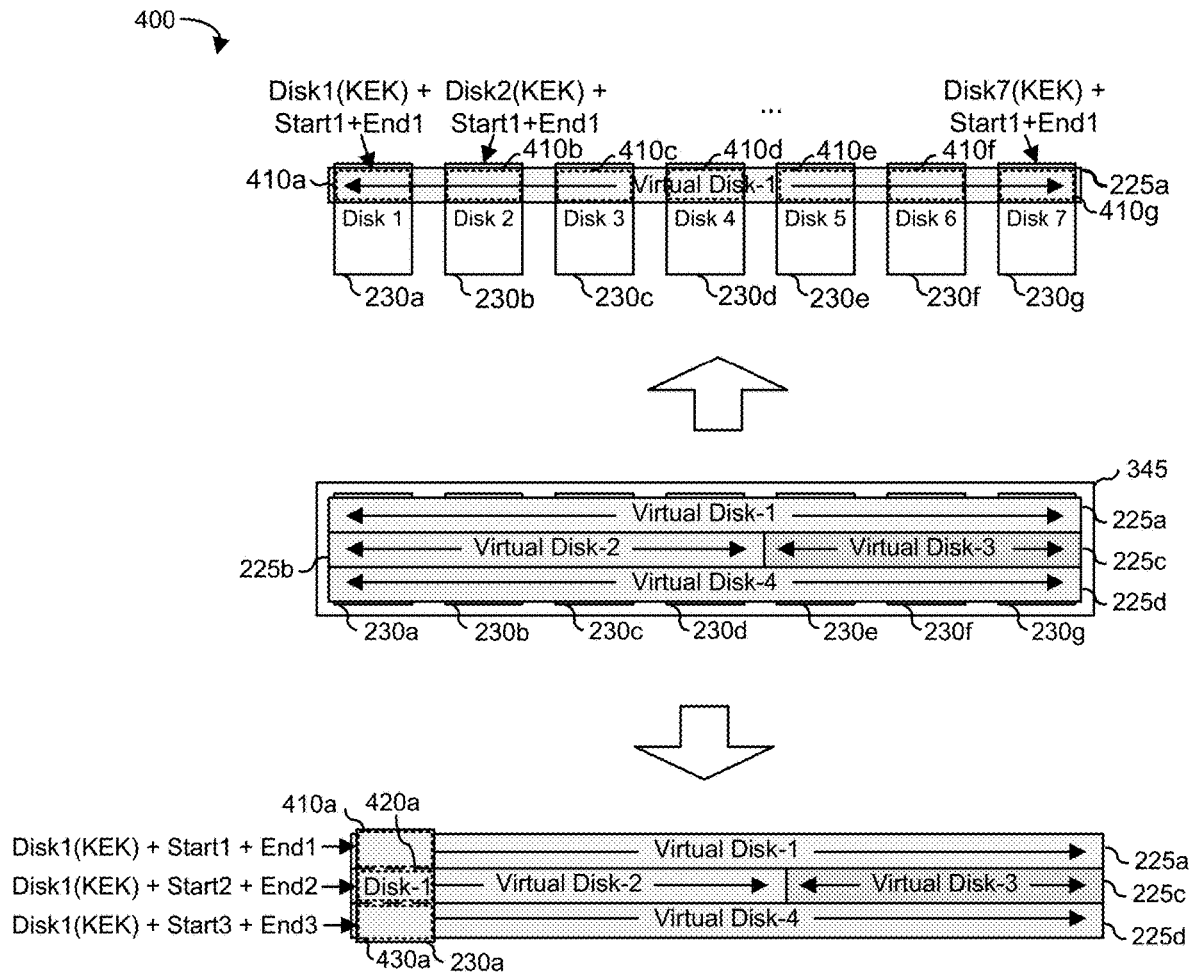
FIG. 4 is a block diagram of an exemplary allocation of persistent storage devices in a data storage, according to at least one embodiment of the present disclosure.

To encrypt the I/O data, encryption/decryption module 340 may generate an MEK and encrypt the MEK with an SKEK. The encryption/decryption module 340 may generate a random MEK for each received write request. Encryption/decryption module 340 then encrypts the I/O data with the encrypted MEK prior to storing the encrypted I/O data in virtual disk 225a. In this example, I/O data in request 325 may be encrypted in seven independent parts because virtual disk 225a is associated with seven different persistent storage devices. For example, a portion of the I/O data may be stored in a slice 410a as shown in FIG. 4. The MEK will be encrypted by the SKEK for disk 1 prior to using the encrypted MEK to encrypt the portion of I/O data to be stored in slice 410a. Similarly, if a portion of the I/O data is to be stored in a slice 410b, as shown in FIG. 4, then the MEK may be encrypted by the SKEK for disk 2 prior to using the encrypted MEK to encrypt the portion of I/O data to be stored in slice 410b. A similar process may be used to for remaining I/O data to the other storage devices in virtual disk 225a.

The encrypted MEK may be stored in data storage system 220 such as in a NVMe or the like. In another embodiment, the encrypted MEK may be stored in key management server 245 such as in a secure vault associated with key management server 245, and an identifier of the encrypted MEK may then be stored in data storage system 220 along with an identifier of the SKEK and/or the KEK. Encryption/decryption module 340 uses the encrypted MEK to decrypt the retrieved I/O data during processing of a read request.

FIG. 4 shows the allocation of the persistent storage devices for the virtual disks in data storage 345 in greater detail. Each virtual disk is an abstraction which maps to one or more storage devices. For example, as shown, virtual disk 225a includes one or more slices across one or more of the persistent storage devices or across one or more RAID groups. For example, virtual disk 225a includes slices from disks 230a-230g, virtual disk 225b includes slices from disk 230a-230d, virtual disk 225c includes slices from disk 230e-230g, virtual disk 225d includes slices from disks 230a-230g. As shown, virtual disk 225a is comprised of slices 410a-410g. Each slice is from a distinct storage device, for example, slice 410a is located at disk 230a, while slice 410b is located at disk 230b, slice 410c is located at disk 230c, slice 410d at disk 230d, slice 410e at disk 230e, slice 410f at disk 230f, and slice 410g is located at disk 230g.

Each virtual disk is obtained by dividing a persistent storage device of one or more persistent storage devices into segments or slices. A slice from at least one or more of the persistent storage devices may be used to form the virtual disk. A virtual disk management module may be used to manage the virtual disks. Management of the virtual disks includes determining the range or storage capacity of each of the virtual disks which includes a start address and an end address. The start address and the end address may be used along with the SKEK for a particular physical disk to encrypt the MEK. Because virtual disk 225a includes seven persistent storage devices, seven KEKs along with the start address and end address of virtual disk 225a may be used to generate the SKEKs. For example, as shown virtual disk 225a, the SKEKs includes the following: "(Disk-1(KEK)+ Start1+End1)+(Disk-2(KEK)+Start1+End1)+(Disk-3 (KEK)+Start1+End1)+(Disk-4(KEK)+Start1+End1)+ (Disk-5(KEK)+Start1+End1)+(Disk-6(KEK)+Start1+ End1)+(Disk-7(KEK)+Start1+End1)," where Start1 refers to the start address and End1 refers to the end address of virtual disk 225a.

In contrast, also shown is how the different slices of the same storage device have different KEKs. For example, disk 230a includes three different slices, slice 410a, a slice 420a, and a slice 430a. Each slice is included in a different virtual disk. Slice 410a is part of virtual disk 225a. Slice 420a is part of virtual disk 225b. Slice 430a is part of virtual disk 225d. Because the three slices are from the same storage device, each slice has the same KEK. However, because each slice is part of a different virtual disk, each slice is part of a different start address and end address. Thus, the combination of the KEK and the start address and the end address provides a unique encryption key for each slice. As shown, the encryption key for slice 410a includes "(Disk1 (KEK)+Start1+End1)" while the encryption key for slice 420a includes "(Disk1 (KEK)+Start2+End2)", and the encryption key for slice 430a includes "(Disk1 (KEK)+ Start3+End3)".

Figure 5:
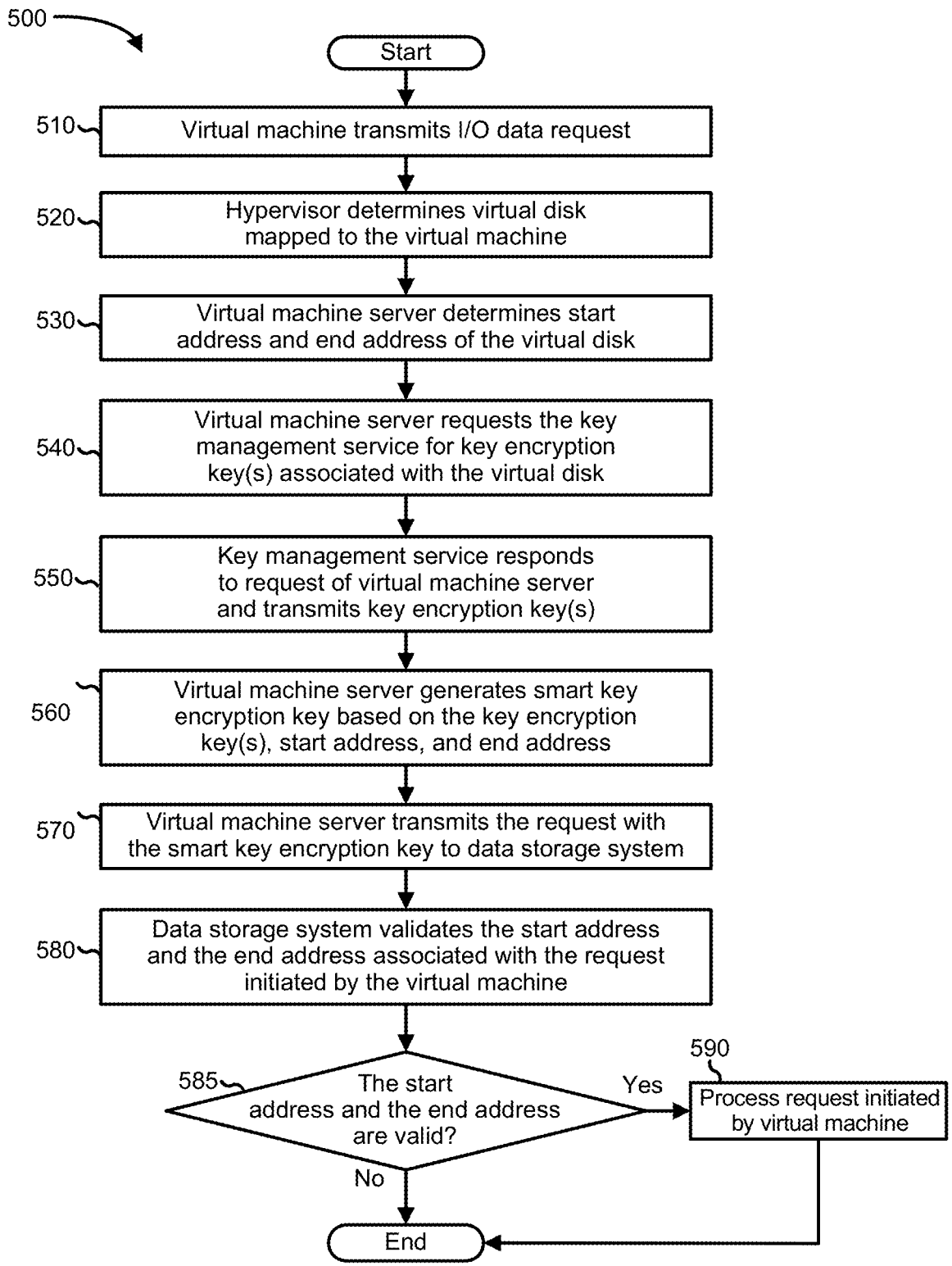
FIG. 5 is a flowchart illustrating a method for implementing encryption for slice virtual disks, according to at least one embodiment of the present disclosure.

FIG. 5 shows a method 500 for implementing encryption for slice virtual disks. The method may be performed by or in a combination of various components depicted in FIGS. 2 and 3 such as the virtual machines, the hypervisor, the virtual machine server, the network, and the key management server. Method 500 typically starts at block 510.

Prior to the start of method 500, the virtual disks may have been provisioned. The provisioning process may include allocating slices of the storage devices to generate the virtual disks. The provisioning process may also include implementing or enabling encryption. The provisioning or portions thereof may be performed automatically or manually via a user interface. The user interface may be available through a web browser which may be communicatively coupled to one or more of the virtual machines, the hypervisor, the virtual machine server, or the key management server. In particular, the LBA ranges may be determined, that is the start address and the end address for each virtual disk may be determined.

At block 510, a virtual machine transmits a request for data access or an I/O request, such as write or read I/O data from a data storage system. The request includes an identifier of the virtual machine making the request. The method proceeds to block 520.

At block 520, the hypervisor receives the I/O request. The hypervisor then determines a virtual disk that is mapped to the virtual machine that initiated the request. A data structure such as a table may be used to identify the mapping. The hypervisor then updates the I/O request with an identifier of the virtual disk associated with the virtual machine and transmits the updated request to the virtual machine server. In addition, the hypervisor may also transmit the virtual machine identifier. In another embodiment, the virtual machine server receives the data request and retrieves the virtual disk identifier from the data structure maintained by the hypervisor. The virtual machine server updates the I/O request. The method proceeds to block 530.

At block 530, the virtual machine server determines the start address and the end address of the virtual disk based on the virtual disk identifier retrieved in block 520. The start address and the end address may identify the location of the virtual disk in a data storage system. Using the start address and the end address, and/or the virtual disk identifier the data storage system may also identify the storage devices that host the virtual disk. In addition, the data storage system may identify the portion or slice of each storage device that forms the virtual disk. The method then proceeds to block 540.

At block 540, the virtual machine server sends a request for a KEK associated with the virtual disk to the KMS. The KMS may be a local KMS (LKMS) or an external KMS (EKMS). The virtual machine server may transmit the virtual disk identifier and/or the start address and the end address along with the KEK request. In addition, the virtual machine server may also transmit the virtual machine identifier, which may be used by key management server 245 to authenticate the request. The method proceeds to block 550.

At block 550, the KMS may respond to the KEK request and transmits the requested KEKs with the response. The KMS may respond after authenticating the I/O request and/or validating the start address and the end address. The number of KEKs transmitted is based on the number of persistent storage devices that hosts the virtual disk, as each persistent storage device has a unique KEK. The method proceeds to block 560.

At block 560, the virtual machine server generates SKEKs based on the KEKs, the start address, and the end address. The virtual machine server may store identifiers of the KEKs and/or the SKEKs in a persistent storage associated with the virtual machine server such as an NVMe. The virtual machine server does not store the KEKs and/or the SKEKs. In another embodiment, the virtual machine server may transmit the SKEKs to the KMS for storage. The method then proceeds to block 570.

At block 570, the virtual machine server transmits the updated I/O request with the SKEKs to the data storage system. The virtual machine server may also transmit the identifier of the virtual machine that issued the I/O request. The virtual machine server may also transmit authentication keys and/or other credentials. The method proceeds to block 580.

At block 580, the data storage system validates the start address and the end address associated with the I/O request. The data storage system may validate the start address and the end address by determining whether the start address and the end address are within the LBAs or LBA range associated with the virtual disk. Further, the data storage system may authenticate the request based the virtual machine identifier, authentication keys and/or the other credentials prior to or after validating the start address and the end addresses. The method proceeds to block 585.

At block 585, if the start address and the end address are valid, the method proceeds to block 590. Otherwise, the data storage system returns an I/O failure then the method ends. At block 590, the data storage system processes the I/O request. If the I/O request is to write data, then the data storage system first encrypts an encryption key, such as an MEK, with the SKEK. The data storage system encrypts the data included with the I/O request with the encrypted MEK prior to storing the data in the virtual disk. If the virtual disk is part of three different persistent storage devices, then the data (based on its size and availability of space in the storage device) or a portion thereof may be encrypted in three different persistent storage devices.

If the request is to read data from the data storage system, then the data storage system queries the virtual disk and decrypts the queried data prior to responding to the I/O request and transmitting the data to the virtual machine. The queried data may be decrypted using the encrypted MEK then included in the response as a payload. After processing the I/O request, the method ends.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein. Also, the term "user" in this context and elsewhere herein is intended to be more broadly construed so as to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
transmitting, by a hardware processor associated with a virtual machine, an input/output request that includes a data payload to write to a data storage system;
identifying a virtual disk that is associated with the virtual machine;
identifying a start address and an end address of the virtual disk;
transmitting a key request for a key encryption key, wherein the key request includes the start address and the end address of the virtual disk;
generating the key encryption key in response to determining that the start address and the end address are valid;
generating a smart key encryption key based on the key encryption key;
encrypting a media encryption key with the smart key encryption key; and
encrypting the data payload with the encrypted media encryption key prior to storing the data payload in the virtual disk.

2. The method of claim 1, wherein the start address and the end address are within a logical block address range.

3. The method of claim 1, wherein the start address is a first logical block of the virtual disk and the end address is a last logical block of the virtual disk.

4. The method of claim 1, further comprising denying the input/output request.

5. The method of claim 4, wherein the identifying of the virtual disk associated with the virtual machine is performed using a mapping table.

6. The method of claim 4, wherein the identifying of the start address and the end address associated with the virtual disk is performed with an address lookup table.

7. The method of claim 1, wherein the key encryption key is generated by a key management service.

8. The method of claim 7, wherein a virtual machine server stores an identifier of the key encryption key.

9. The method of claim 1, wherein the key encryption key is associated with a persistent storage device.

10. An information handling system, comprising:
a processor; and
a memory device storing code that when executed causes the processor to perform operations, the operations including:
transmitting an input/output request that includes a data payload to write to a data storage system;
identifying a virtual disk that is associated with a virtual machine;
identifying a start address and an end address of the virtual disk;
transmitting a key request for a key encryption key, wherein the key request includes the start address and the end address of the virtual disk;
generating the key encryption key, in response to determining that the start address and the end address are valid;
generating a smart key encryption key based on the key encryption key;
encrypting a media encryption key with the smart key encryption key; and
encrypting the data payload with the encrypted media encryption key prior to storing the data payload in the virtual disk.

11. The information handling system of claim 10, wherein the data payload is decrypted with the encrypted media encryption key.

12. The information handling system of claim 11, wherein the encrypted media encryption key is stored in the data storage system with an identifier of the smart key encryption key.

13. The information handling system of claim 12, wherein the smart key encryption key includes the key encryption key, the start address, and the end address.

14. The information handling system of claim 10, wherein the start address indicates a first logical block.

15. The information handling system of claim 14, wherein the determining whether the start address and the end address are valid includes determining whether the start address and the end address are within a logical block address range.

16. A non-transitory computer-readable medium to store instructions that are executable to perform operations comprising:
transmitting an input/output request that includes a data payload to write to a data storage system;
identifying a virtual disk that is associated with a virtual machine;
identifying a start address and an end address of the virtual disk;
transmitting a key request for a key encryption key, wherein the key request includes the start address and the end address of the virtual disk;

generating the key encryption key in response to determining that the start address and the end address are valid;

generating a smart key encryption key based on the key encryption key;

encrypting a media encryption key with the smart key encryption key; and encrypting the data payload with the encrypted media encryption key prior to storing the data payload in the virtual disk.

17. The non-transitory computer-readable medium of claim 16, wherein the smart key encryption key includes the key encryption key, the start address, and the end address.

18. The non-transitory computer-readable medium of claim 7, wherein a virtual machine server stores an identifier of the key encryption key.

19. The non-transitory computer-readable medium of claim 16, wherein the start address and the end address are within a logical block address range.

20. The non-transitory computer-readable medium of claim 19, wherein the virtual disk includes the logical block address range.

\* \* \* \* \*